Dec. 17, 1929.                C. S. HALL                1,740,088
                     AIRCRAFT PROPELLING MECHANISM
                         Filed Jan. 3, 1928            2 Sheets-Sheet 1
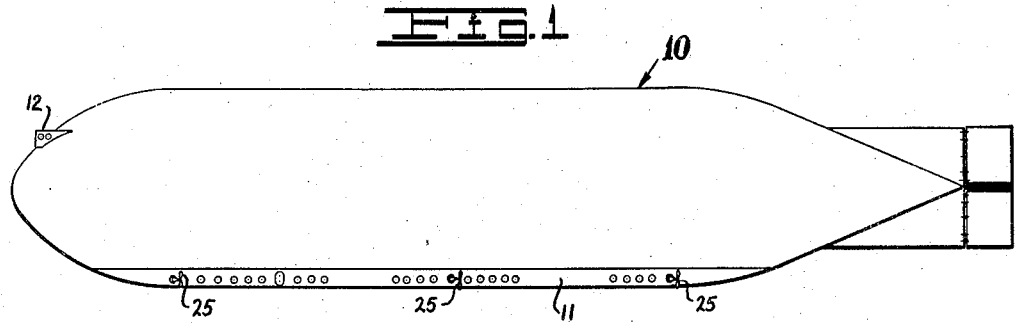
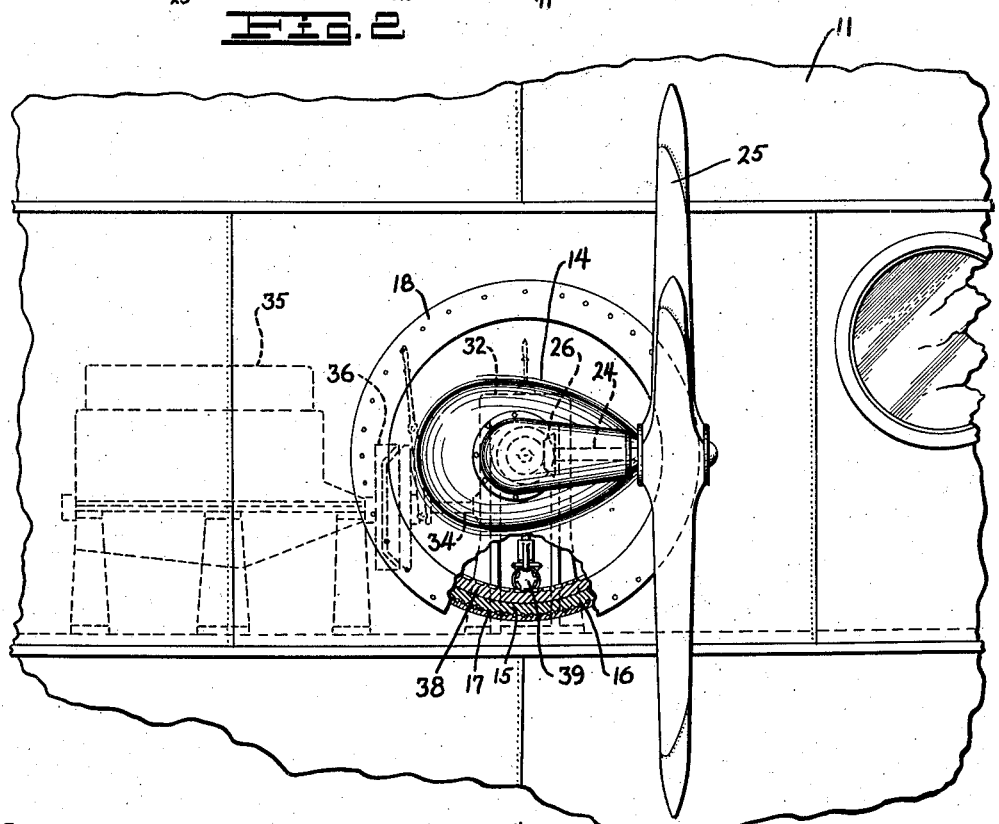
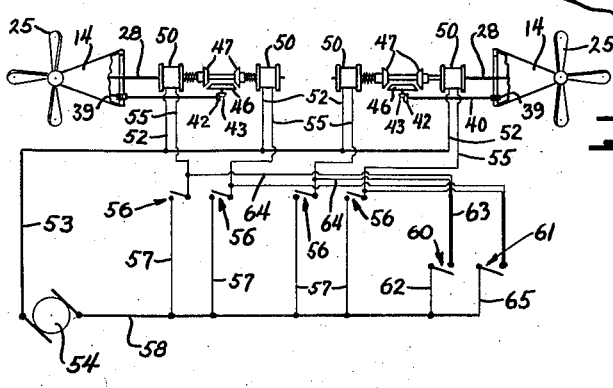
INVENTOR.
C. S. HALL
BY
ATTORNEY.

Dec. 17, 1929.                    C. S. HALL                    1,740,088
                        AIRCRAFT PROPELLING MECHANISM
                           Filed Jan. 3, 1928            2 Sheets-Sheet 2
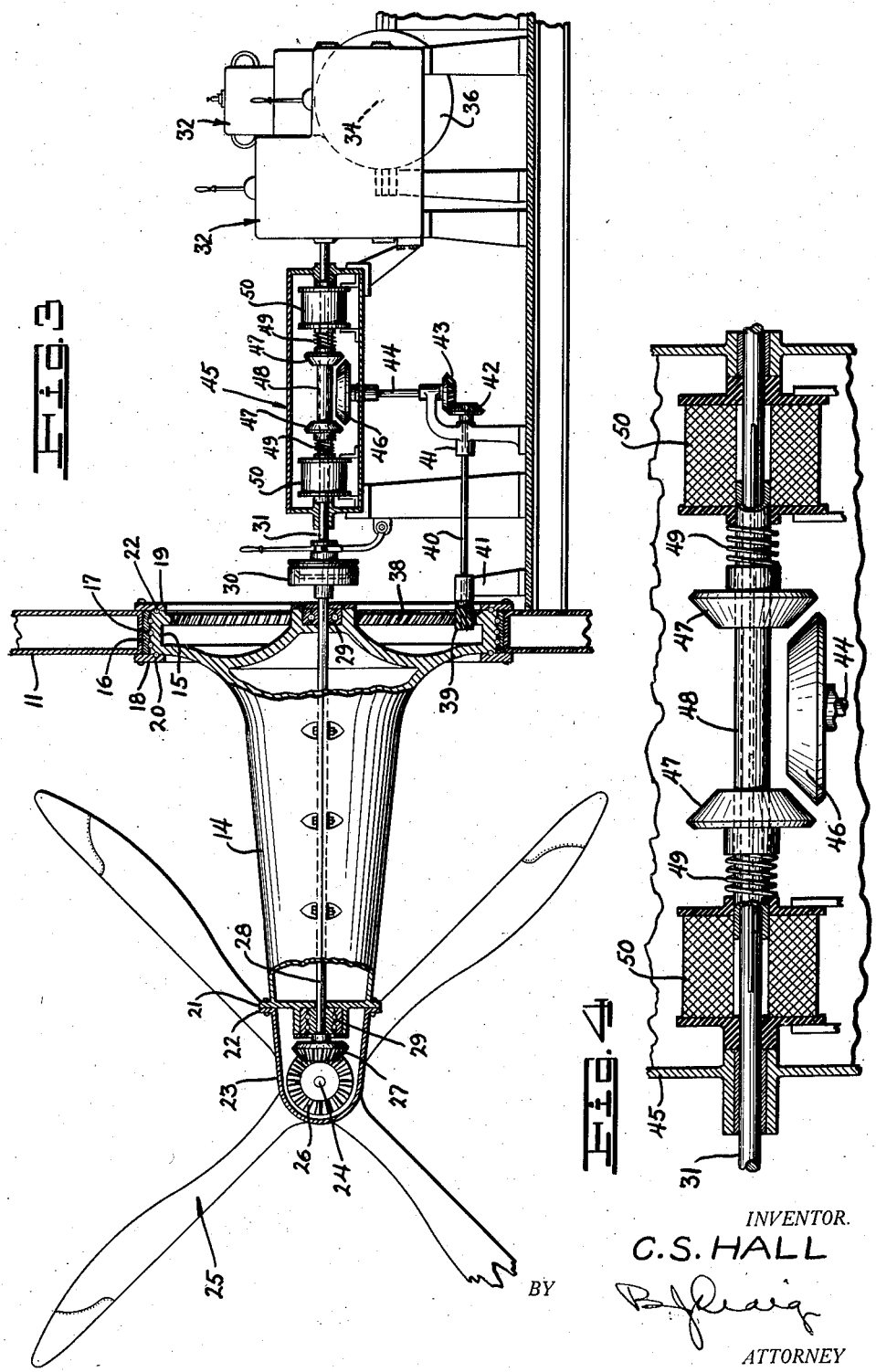
INVENTOR.
C. S. HALL
BY
ATTORNEY Patented Dec. 17, 1929

1,740,088

UNITED STATES PATENT OFFICE

CHARLES S. HALL, OF LOS ANGELES, CALIFORNIA, ASSIGNOR TO HALL ENGINEERING & AIRCRAFT CONSTRUCTION COMPANY, A CORPORATION OF NEVADA

AIRCRAFT-PROPELLING MECHANISM

Application filed January 3, 1928. Serial No. 244,079.

This invention relates to improvements in aircraft propelling mechanisms.

This invention is an improvement over my prior Patent No. 1,659,098, granted Feb. 14, 1928, and the general object of this invention is to provide an improved aircraft propelling device wherein a propeller is mounted to move to positions to give a thrust in different directions and wherein an improved means is provided for changing the angle of propeller thrust without disturbing the prime mover driving the propeller.

Another object of this invention is to provide means whereby the propeller may be moved bodily to alter the angle of thrust by power derived from the propeller drive shaft without disturbing the speed of the propeller drive shaft.

A further object of this invention is to provide means whereby the propeller may be moved bodily by the power derived from the propeller drive shaft without the propeller itself being in motion.

Other objects and advantages of this invention will be apparent from the following description taken in connection with the accompanying drawings wherein:

Fig. 1 is a side view of an aircraft embodying the features of my invention.

Fig. 2 is an elevation of a portion of an aircraft showing my improved propeller mechanism partly in section.

Fig. 3 is an elevation partly in section taken at right angles to the elevation shown in Fig. 2.

Fig. 4 is a fragmentary enlarged view partly in section of my improved propeller shifting mechanism, and Fig. 5 is a diagrammatic view showing the electrical controls for my improved propeller shifting mechanism.

Referring to the drawings by reference characters I have indicated an aircraft generally at 10 which includes a main cabin portion 11 and a control cabin 12. In the embodiment shown the propeller mechanism includes a casing 14 which is rotatably mounted on the cabin body 11. It will be understood that although I have shown my improved propeller mechanism in combination with a lighter-than-air type of craft such as a dirigible, that it may be used in combination with heavier-than-air craft such as an airplane or helicopter.

The casing 14 has a base flange 15 thereon which fits within a collar 16 secured to the body 11, while suitable anti-friction means such as ball bearings 17 serve to provide smooth operation.

In order to prevent tilting of the propeller casing 14 and at the same time provide ease of operation, I provide retaining plates 18 and 19 on opposite sides of the base flange 15. Ball races 20 between the plates and the base flange furnish an anti-friction bearing for this portion of the device.

The casing 14 preferably tapers as shown and at its outer end is provided with a flange 21 for engagement with a flange 22 on a propeller gear housing 23. The propeller is shown as provided with a shaft 24 and the propeller indicated at 25 is of the four bladed pusher type although it will be understood that a greater or less number of blades may be provided and the propeller may be of the tractor type if desired.

Mounted on the shaft 24 and rigid with respect to the propeller 25 I have shown a bevel gear 26. This bevel gear 26 meshes with a companion bevel gear 27 which is adapted to be driven by a shaft 28 mounted in anti-friction bearings 29 as shown in Fig. 3.

The shaft 28 passes through the interior of the casing 14 and is adapted to be connected by means of a clutch mechanism 30 with a shaft 31 of a change speed and reversing transmission mechanism 32 which may be of any desired type suitable for the work required of it.

The transmission mechanism 32 is shown as adapted to be actuated by a shaft 34 which is shown as driven from an engine 35 through the medium of a clutch mechanism 36.

From the foregoing description it will be apparent that when the clutches 36 and 30 and the transmission mechanism 32 are set to an operative position and the engine 35 put in operation the shafts 31, 28 and 24 will be caused to rotate and thus drive the propeller 25.

In order to rotate the casing 14 and thus change the direction of the thrust of the propeller, I show an internal mitre gear 38 mounted in the base flange 15. The gear 38 meshes with a mitre pinion 39 on one end of a shaft 40 which is journalled thereto adjacent its opposite end. The bevel gear 42 meshes with a companion bevel gear 43 mounted on a vertical shaft 44 which extends into a housing 45 surrounding the shaft 31. Secured adjacent the end of the shaft 44 within the housing 45 I provide a bevel friction drive disk 46. For driving the disk 46 I provide a pair of oppositely disposed bevel disks 47 which are secured to a sleeve 48 surrounding the shaft 31 as shown in Fig. 4. The sleeve 48 is shown as adapted to be rotated by the shaft 31 through the medium of a spline 48' but any other suitable means may be used if desired.

The disk 46 and the disks 47 may be made of any suitable material but I prefer to construct them of fibre. The disks 47 are normally adapted to be retained out of contact with the disk 47 by coiled springs 49 surrounding the sleeve 48.

For moving the disks 47 one at a time into contact with the disk 46, I provide a pair of solenoids 50 which are positioned adjacent each end of the sleeve 48 and surround the shaft 31. The opposite ends of the sleeve 48 each extend into their respective solenoids 50 and form the cores of the solenoids.

When the shaft 31 is revolved as previously described and one of the solenoids is energized it will cause the sleeve 48 to move against the action of one of the springs 49 and move one of the disks 47 into contact with the disk 46. Whereupon the disk 46 will, through the medium of shaft 44, gears 43 and 42, and shaft 40, cause the mitre pinion 39 to revolve and thereby rotate the mitre gear 38. As the gear 38 rotates it will turn the casing 14 and shift the angle of thrust of the propeller 25. When the solenoid 50 is de-energized the compressed spring 49 will move the sleeve 48 back to its normal position wherein both the disks 47 are out of engagement with the disk 46 as shown in Fig. 4, whereupon the pinion 39 will cease to rotate the casing 14.

If it is desired to rotate the casing 14 without actuating the propeller 25 the clutch 36 and the transmission mechanism are set to operative positions and the clutch 30 is set to a disengaged position, whereupon the casing 14 may be revolved as previously described without revolving the shaft 28.

In Fig. 5 I have shown diagrammatically one method of wiring the solenoids 50 of a plurality of propeller mechanisms so that they may be operated from a central station such as the control cabin 12 of the dirigible. In Fig. 5 I have shown one end of the windings of the solenoids 50 as each connected by a wire 52 to a lead wire 53 from a motor generator 54. The opposite end of the windings of each of the solenoids is connected by a wire 55 to one terminal of a switch 56. The other terminal of the switch 56 is connected by a wire 57 to another lead wire 58 from the generator 54. The switch 56 operates the solenoids 50 individually and for simultaneously operating all the solenoids of corresponding thrust at the same time I provide switches 60 and 61. One terminal of the switch 60 is connected by a wire 62 to the lead wire 58 and to the other terminal of the switch 60 a cable 63 is connected. This cable 63 includes a plurality of wires 64, each of which is connected to the wire 55 of all of the solenoids of the same thrust. Thus when the switch 60 is closed all the solenoids of the same action will be actuated.

One terminal of the switch 61 is connected by a wire 65 to the lead wire 58 and to the other terminal of the switch 61 a cable 66 is connected. This cable 66 includes a plurality of wires 67, each of which is connected to the wire 55 of all the solenoids having a thrust opposite to those to which the wires 64 are connected.

From the foregoing description it will be apparent that I have provided a novel means for shifting the angle of thrust of a propeller which is simple in construction and highly efficient in use.

Having thus described my invention, I claim:

1. In an aircraft including a body portion, a propeller, a propeller support mounted to rotate on said body, a shaft adapted to drive said propeller, a prime mover, said prime mover being adapted to drive said shaft, a gear on said propeller support, a pinion gear, said pinion gear being adapted to drive said first gear to thereby rotate said propeller support and means operable independently of said propeller to drive said pinion gear from said prime mover.

2. In an aircraft including a body portion, a propeller, a propeller support mounted to rotate on said body, a shaft adapted to drive said propeller, a prime mover, said prime mover being adapted to drive said shaft, a gear on said propeller support, a pinion gear, said pinion gear being adapted to drive said first gear to thereby rotate said propeller support and means to drive said pinion gear from said prime mover.

3. In an aircraft including a body portion, a propeller, a propeller support mounted to rotate on said body, a shaft adapted to drive said propeller, a second shaft, clutch means adapted to operatively connect said first and second shafts, a prime mover, said prime mover being adapted to drive said second shaft, a gear on said propeller support, a pinion gear, said pinion gear being adapted to drive said first gear to thereby rotate said propeller support, means to drive said pinion gear, said means including a third shaft operatively connected to a fourth shaft, a friction drive disk on said fourth shaft, a slidable sleeve on said second shaft operatively engaging said second shaft, a pair of spaced oppositely disposed disks on said sleeve, means to move said disks into and out of engagement with said drive disk and means adapted to normally maintain said disks out of engagement with said drive disk.

4. In an aircraft including a body portion, a propeller, a propeller support mounted to rotate on said body, a shaft adapted to drive said propeller, a second shaft, clutch means adapted to operatively connect said first and second shafts, a prime mover, said prime mover being adapted to drive said second shaft through the medium of a change speed transmission, a gear on said propeller support, a pinion gear, said pinion gear being adapted to drive said first gear to thereby rotate said propeller support, means to drive said pinion gear, said means including a third shaft operatively connected to a fourth shaft, a friction drive disk on said fourth shaft, a slidable sleeve on said second shaft operatively engaging said second shaft, a pair of spaced oppositely disposed disks on said sleeve, means to move said disks into and out of engagement with said drive disk, said last mentioned means including a solenoid.

5. In an aircraft including a body portion, a propeller, a propeller support mounted to rotate on said body, a shaft adapted to drive said propeller, a second shaft, clutch means adapted to operatively connect said first and second shafts, a prime mover, said prime mover being adapted to drive said second shaft through the medium of a change speed transmission, a gear on said propeller support, a pinion gear, said pinion gear being adapted to drive said first gear to thereby rotate said propeller support, means to drive said pinion gear, said means including a third shaft operatively connected to a fourth shaft, a friction drive disk on said fourth shaft, a slidable sleeve on said second shaft operatively engaging said second shaft, a pair of spaced oppositely disposed disks on said sleeve, means to move said disks into and out of engagement with said drive disk, said last mentioned means including a solenoid adjacent each end of said sleeve, each end of said sleeve projecting into its adjacent solenoid to form the core thereof, resilient means engaging each of said disks adapted to normally maintain said disks out of engagement with said drive disk, each of said solenoids when energized being adapted to move one of said disks into engagement with said drive disk to thereby cause said drive disk to drive said pinion gear and rotate said propeller support upon actuation of said prime mover.

In testimony whereof, I hereunto affix my signature.

CHARLES S. HALL.